United States Patent
Chakraborty et al.

(10) Patent No.: US 10,941,547 B2
(45) Date of Patent: Mar. 9, 2021

(54) IOT CONNECTED HANDWASHING MONITORING AND COMPLIANCE FOR VARIOUS APPLICATIONS

(71) Applicant: Zurn Industries, LLC, Milwaukee, WI (US)

(72) Inventors: Arindam Chakraborty, Milwaukee, WI (US); Long Larry Le, Morrisville, NC (US); Michael Pynn, Chapel Hill, NC (US); Thushan Kapilajith Hemanchandra, Wauwatosa, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/012,840

(22) Filed: Sep. 4, 2020

(65) Prior Publication Data

US 2020/0399873 A1    Dec. 24, 2020

Related U.S. Application Data

(63) Continuation of application No. 16/799,705, filed on Feb. 24, 2020.

(Continued)

(51) Int. Cl.
| | |
|---|---|
| *E03C 1/04* | (2006.01) |
| *G01F 15/06* | (2006.01) |
| *G01F 9/00* | (2006.01) |
| *G01K 13/02* | (2021.01) |
| *G01P 13/00* | (2006.01) |

(Continued)

(52) U.S. Cl.
CPC ............ *E03C 1/0412* (2013.01); *E03C 1/046* (2013.01); *G01F 9/001* (2013.01); *G01F 15/06* (2013.01); *G01F 15/068* (2013.01); *G01K 13/02* (2013.01); *G01P 13/0006* (2013.01); *G04F 10/10* (2013.01); *E03C 2001/0418* (2013.01)

(58) Field of Classification Search
CPC . G01F 9/001; G01F 15/068; G01K 2013/026; E03C 1/0412; E03C 2001/0418
See application file for complete search history.

(56) References Cited

U.S. PATENT DOCUMENTS

| | | | |
|---|---|---|---|
| 1,494,883 A | 5/1924 | Bassette et al. | |
| 1,765,915 A | 6/1930 | Haase | |

(Continued)

FOREIGN PATENT DOCUMENTS

| | | |
|---|---|---|
| CA | 2872011 C | 5/2017 |
| CN | 103758183 A | 4/2014 |

(Continued)

*Primary Examiner* — Paul M. West
(74) *Attorney, Agent, or Firm* — Michael Best & Friedrich LLP

(57) ABSTRACT

A plumbing fixture assembly including a fluid flow detection system for monitoring fluid flow and flow characteristics through plumbing fixtures without contacting the fluid. The fluid flow detection system communicates collected data related to the plumbing fixtures to a water management system, which analyzes the data and provides information to a user through a portal and user interface. The fluid flow detection system also tracks users of the plumbing fixtures for compliance with a hand washing routine. The hand washing compliance data is communicated to the water management system as well.

17 Claims, 9 Drawing Sheets

Related U.S. Application Data

(60) Provisional application No. 62/809,205, filed on Feb. 22, 2019.

(51) Int. Cl.
*E03C 1/046* (2006.01)
*G04F 10/10* (2006.01)

(56) References Cited

U.S. PATENT DOCUMENTS

| | | | |
|---|---|---|---|
| 2,192,383 A | 3/1940 | Krolop | |
| 2,504,740 A | 4/1950 | Siegel | |
| 3,282,519 A | 11/1966 | Rheinstrom | |
| 3,358,747 A | 12/1967 | Lesher et al. | |
| 3,449,838 A | 6/1969 | Chancellor, Jr. | |
| 4,012,007 A | 3/1977 | Cunningham | |
| 4,144,596 A | 3/1979 | MacFarlane et al. | |
| 4,145,769 A | 3/1979 | MacFarlane et al. | |
| 4,295,233 A | 10/1981 | Hinkel et al. | |
| 4,336,619 A | 6/1982 | Hinkel et al. | |
| 5,031,258 A | 7/1991 | Shaw | |
| 5,199,118 A | 4/1993 | Cole et al. | |
| 5,311,986 A | 5/1994 | Putz | |
| 5,625,908 A | 5/1997 | Shaw | |
| 5,765,242 A | 6/1998 | Marciano | |
| 5,945,910 A | 8/1999 | Gorra | |
| 5,992,430 A | 11/1999 | Chardack et al. | |
| 6,007,019 A | 12/1999 | Lynch | |
| 6,079,603 A | 6/2000 | Smegal | |
| 6,213,424 B1 | 4/2001 | Helfer-Grand | |
| 6,236,317 B1 | 5/2001 | Cohen et al. | |
| 6,426,701 B1 * | 7/2002 | Levy | G08B 21/24 137/552.7 |
| 6,497,345 B1 | 12/2002 | Wilker et al. | |
| 6,727,818 B1 | 4/2004 | Wildman et al. | |
| 6,975,231 B2 | 12/2005 | Lane et al. | |
| 7,015,816 B2 | 3/2006 | Wildman et al. | |
| 7,107,631 B2 | 9/2006 | Lang et al. | |
| 7,228,874 B2 | 6/2007 | Bolderheij et al. | |
| 7,372,367 B2 | 5/2008 | Lane et al. | |
| 7,408,470 B2 | 8/2008 | Wildman et al. | |
| 7,425,900 B2 | 9/2008 | Lynn et al. | |
| 7,437,833 B2 | 10/2008 | Sato et al. | |
| 7,458,523 B2 | 12/2008 | Hyslop | |
| 7,605,704 B2 | 10/2009 | Munro et al. | |
| 7,607,442 B2 | 10/2009 | Barnhill et al. | |
| 7,607,443 B2 | 10/2009 | Barnhill et al. | |
| 7,617,830 B2 | 11/2009 | Barnhill et al. | |
| 7,641,740 B2 | 1/2010 | Barnhill et al. | |
| 7,698,770 B2 | 4/2010 | Barnhill et al. | |
| 7,754,021 B2 | 7/2010 | Barnhill et al. | |
| 7,754,022 B2 | 7/2010 | Barnhill et al. | |
| 7,755,494 B2 | 7/2010 | Melker et al. | |
| 7,757,700 B2 | 7/2010 | Barnhill et al. | |
| 7,758,701 B2 | 7/2010 | Barnhill et al. | |
| 7,789,095 B2 | 9/2010 | Barnhill et al. | |
| 7,804,409 B2 | 9/2010 | Munro et al. | |
| 7,812,730 B2 | 10/2010 | Wildman et al. | |
| 7,819,136 B1 | 10/2010 | Eddy | |
| 7,883,585 B2 | 2/2011 | Barnhill et al. | |
| 7,898,407 B2 | 3/2011 | Hufton et al. | |
| 7,901,513 B2 | 3/2011 | Barnhill et al. | |
| 7,952,233 B2 | 5/2011 | Bayley et al. | |
| 7,993,471 B2 | 8/2011 | Barnhill et al. | |
| 8,151,481 B2 | 4/2012 | Perez, Jr. | |
| 8,181,289 B2 | 5/2012 | Schmitt et al. | |
| 8,201,344 B2 | 6/2012 | Sawabe et al. | |
| 8,237,558 B2 | 8/2012 | Seyed Momen et al. | |
| 8,264,343 B2 | 9/2012 | Snodgrass | |
| 8,296,875 B2 | 10/2012 | Loberger et al. | |
| 8,368,544 B2 | 2/2013 | Wildman et al. | |
| 8,525,666 B2 | 9/2013 | Melker et al. | |
| 8,564,431 B2 | 10/2013 | Snodgrass | |
| 8,598,996 B2 | 12/2013 | Wildman et al. | |
| 8,997,271 B2 | 4/2015 | Bayley et al. | |
| 9,011,607 B2 | 4/2015 | De Luca et al. | |
| 9,157,223 B2 | 10/2015 | Kempen et al. | |
| 9,235,977 B2 | 1/2016 | Deutsch | |
| 9,267,736 B2 | 2/2016 | Bayley et al. | |
| 9,349,267 B2 | 5/2016 | Wildman et al. | |
| 9,396,638 B2 | 7/2016 | Wildman et al. | |
| 9,421,291 B2 | 8/2016 | Robert et al. | |
| 9,441,885 B2 | 9/2016 | Bayley et al. | |
| 9,492,039 B2 | 11/2016 | Courtney | |
| 9,518,681 B2 | 12/2016 | Williamson | |
| 9,536,415 B2 | 1/2017 | De Luca et al. | |
| 9,565,979 B2 | 2/2017 | Maclaine et al. | |
| 9,715,817 B2 | 7/2017 | Wildman et al. | |
| 9,758,953 B2 | 9/2017 | Bayley et al. | |
| 9,856,635 B1 | 1/2018 | Liu | |
| 9,877,620 B2 | 1/2018 | Gallob | |
| 9,911,312 B2 | 3/2018 | Wildman et al. | |
| 9,995,025 B2 | 6/2018 | Wang et al. | |
| 10,041,236 B2 | 8/2018 | Loberger et al. | |
| 10,172,498 B2 | 1/2019 | Bayley et al. | |
| 10,235,865 B2 | 3/2019 | Thyroff | |
| 10,332,382 B2 | 6/2019 | Thyroff | |
| 10,403,121 B2 | 9/2019 | Liu et al. | |
| 2002/0020077 A1 | 2/2002 | Haraga et al. | |
| 2003/0019031 A1 * | 1/2003 | Mosis | E03C 1/18 4/625 |
| 2004/0083546 A1 | 5/2004 | Tahara et al. | |
| 2005/0284881 A1 | 12/2005 | Haddad et al. | |
| 2006/0101575 A1 | 5/2006 | Louis | |
| 2008/0017684 A1 | 1/2008 | Digiacomo | |
| 2009/0000024 A1 | 1/2009 | Louis et al. | |
| 2009/0236952 A1 | 9/2009 | Giulio | |
| 2010/0025609 A1 | 2/2010 | Pubben et al. | |
| 2010/0108798 A1 | 5/2010 | Louis | |
| 2012/0260418 A1 | 10/2012 | Rundberg et al. | |
| 2012/0261506 A1 | 10/2012 | Buelow et al. | |
| 2012/0291195 A1 | 11/2012 | Courtney et al. | |
| 2013/0025045 A1 | 1/2013 | Gagnon et al. | |
| 2014/0021215 A1 | 1/2014 | Tran | |
| 2014/0261710 A1 | 9/2014 | Gallob | |
| 2015/0083748 A1 | 3/2015 | McHale et al. | |
| 2015/0101121 A1 | 4/2015 | Burgo, Sr. et al. | |
| 2015/0135429 A1 | 5/2015 | Dyson | |
| 2015/0315771 A1 | 11/2015 | Abramson et al. | |
| 2015/0376881 A1 | 12/2015 | Moe | |
| 2018/0143047 A1 | 5/2018 | Gal | |
| 2018/0143056 A1 | 5/2018 | Gal | |
| 2018/0143598 A1 | 5/2018 | Tahan et al. | |
| 2018/0221527 A1 | 8/2018 | Riggio et al. | |
| 2018/0251964 A1 | 9/2018 | Chung | |
| 2018/0301014 A1 | 10/2018 | Worral et al. | |
| 2018/0313069 A1 * | 11/2018 | Cipriani | E03C 1/055 |
| 2018/0357886 A1 | 12/2018 | Tavori et al. | |
| 2019/0001009 A1 | 1/2019 | Jennings | |
| 2019/0012898 A1 | 1/2019 | Wittrup | |
| 2019/0043337 A1 | 2/2019 | Liu et al. | |
| 2019/0087510 A1 | 3/2019 | Rexach et al. | |
| 2019/0228640 A1 | 7/2019 | Freedman et al. | |

FOREIGN PATENT DOCUMENTS

| | | |
|---|---|---|
| CN | 203846569 U | 9/2014 |
| CN | 204459433 U | 7/2015 |
| CN | 204753730 U | 11/2015 |
| CN | 106923721 A | 7/2017 |
| CN | 206846080 U | 1/2018 |
| DE | 3835738 A1 | 5/1989 |
| DE | 202012007979 U1 | 9/2012 |
| JP | 3341535 B2 | 11/2002 |
| JP | 2006304926 A | 11/2006 |
| WO | 2006058374 A1 | 6/2006 |
| WO | 2007015036 A1 | 2/2007 |
| WO | 2009062546 A1 | 5/2009 |
| WO | 2012076521 A1 | 6/2012 |
| WO | 2012135830 A1 | 10/2012 |
| WO | 2017201192 A1 | 11/2017 |

* cited by examiner

IOT CONNECTED HANDWASHING MONITORING AND COMPLIANCE FOR VARIOUS APPLICATIONS

CROSS-REFERENCE TO RELATED APPLICATIONS

This application is a continuation of U.S. patent application Ser. No. 16/799,705, filed on Feb. 24, 2020, which claims priority to U.S. Provisional Patent Application No. 62/809,205 filed on Feb. 22, 2019, the entire contents of which are incorporated herein by reference.

FIELD

The present disclosure relates to faucets, and more particularly to a system configured to detect the flow of fluid through a faucet using non-contact sensors.

BACKGROUND

In a variety of applications, it may be useful to measure the flow rate of bulk fluid movement through an apparatus connected to a system of pipes. In particular, measuring the flow of water in plumbing systems can help diagnose potential problems, help predict the quantity of water usage, or be used to collect information about how the device is being used by the end user.

Conventional systems have allowed measurement of the flow of water through plumbing fixtures, such as manual faucets, via direct-contact flow meters such as, for example, mechanical flow meters, venturi flow meters, variable-area flow meter, and the like.

SUMMARY

The disclosure provides, in one aspect, a faucet comprising a spout in fluid communication with a fluid source, a handle configured to control flow of fluid from the fluid source through the spout, a magnet positioned on the handle, a first sensor configured to detect a position of the magnet as the handle is moved, a controller in communication with the first sensor, wherein the controller is configured to determine at least one flow condition of the faucet upon activation of the handle to generate fluid flow through the spout, the at least one flow condition based on a position of the magnet, and a user interface in connection with the controller, wherein the user interface is configured to display the at least one flow condition.

The disclosure provides, in another aspect, a plumbing fixture assembly comprising a plumbing fixture including a handle, a first sensor positioned on the handle, a soap dispenser including a second sensor to activate the soap dispenser, and a controller in communication with the first sensor and the second sensor. The controller includes a memory configured to store instructions, and a processor coupled to the memory and configured, via execution of the instructions, to: determine whether a hand-washing activity is in compliance with a predetermined hand washing routine based on the first sensor detecting how long the handle is maintained at an ON position and whether the second sensor is triggered after the handle turned to an ON position, and a user interface in communication with the controller, wherein the user interface is configured to display whether the hand-washing activity is in compliance with the hand washing routine.

The disclosure provides, in another aspect, a method of detecting flow through a faucet. The method comprises detecting an angular position of a magnet disposed on a handle of the faucet, determining, with a controller, whether water is flowing through the faucet based on the position of the magnet, determining, with the controller, a predicted rate of flow through the faucet when water is flowing through the faucet, and displaying the predicted rate of flow on a user interface.

Other features and aspects of this disclosure will become apparent by consideration of the following detailed description and accompanying drawings.

DETAILED DESCRIPTION

Figure 1:
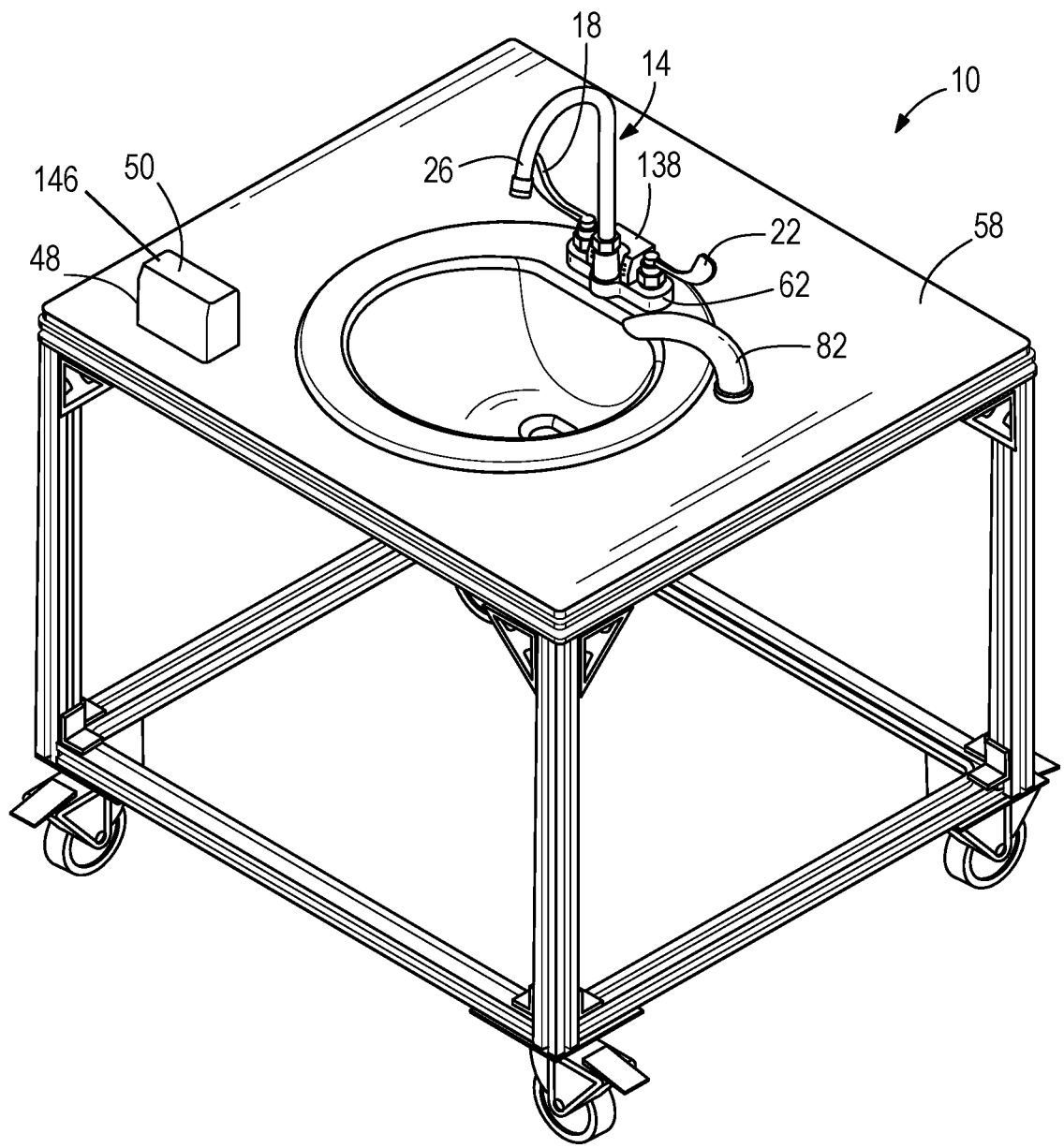
FIG. 1 is a perspective view of a plumbing fixture assembly in accordance with an embodiment of the disclosure.

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

The present disclosure provides a plumbing fixture assembly including a fluid flow detection system for monitoring fluid flow and flow characteristics through plumbing fixtures without contacting the fluid. The fluid flow detection system communicates collected data related to the plumbing fixtures to a water management system, which analyzes the data and provides information to a user through a portal and user interface. The fluid flow detection system also tracks users of the plumbing fixtures for compliance with a hand washing routine. The hand washing compliance data is communicated to the water management system as well.

The plumbing fixture assembly includes a plumbing fixture, an optional soap dispenser, and a fluid flow detection system. The plumbing fixture comprises, but is not limited to a manual faucet (e.g., single handle, double handle, or metering type), a tub filler, or a shower head. As noted above, it can be useful to measure the flow of water through a plumbing fixture without making contact with the flow of water. In the plumbing fixtures disclosed herein, a non-contact sensor is positioned on the plumbing fixture that can be used to determine flow measurements or qualities of flow through the fixture. In one example, the sensor is positioned on a handle of the fixture that controls a valve, which controls fluid flow from a fluid source to and through the plumbing fixture. The non-contact sensor detects displacement of the handle, which determines the flow and flow characteristics, and communicates the flow and flow characteristics to the water management system for further processing, analysis, and display. In this way, an in-line sensor or flow meter does not need to be placed directly in the flow of water to determine or calculate accurate flow metrics or characteristics of the plumbing fixture during use. As such, the non-contact sensor may be less prone to failure and not need to pass various compliance measures if it is to come into direct contact with the fluid stream. Still further, because the non-contact sensor on the handle is external to the flow path, such non-contact sensor may be readily retrofit on existing plumbing fixture installations without changing the underlying pre-installed plumbing and can be much more easily replaced in the case of failure of the non-contact sensor.

The non-contact sensor may include a calibration process prior to use to ensure accurate estimations relating to flow and/or other flow characteristics are collected and communicated to the water management system. For example, maximum flow rate and temperature may be measured in the fluid flow sources leading to the plumbing fixture and provided to hardware and/or software of the monitoring system connected to the non-contact sensor. Consequently, the flow rate and temperature of a mixed-flow outlet of the plumbing fixture can be readily predicted or estimated simply from linear or angular displacement detection of the handles lined to the valves providing flow to the plumbing fixture.

The system and method described herein may be particularly useful in assisting and monitoring hand-washing compliance in the workplace, especially in hospital and food service environments. However, other applications of the system and method are contemplated which could involve just generally tracking the water usage of a particular plumbing fixture.

FIG. 1 illustrates a plumbing fixture assembly 10 for use in a home, business, industrial site, and the like. The plumbing fixture assembly 10 includes a faucet 14 (e.g., a manual faucet) having a first handle 18 (e.g., a hot water handle) and a second handle 22 (e.g., a cold water handle) which are each connected to an underlying valve that controls water flow from a source to a spout 26 of the faucet 14. The assembly 10 additionally includes a fluid flow detection system 30 (see FIG. 3) configured to detect when fluid is moving from the source to the spout 26. In general, the fluid flow detection system 30 is configured to detect the position of the handles 18, 22 relative to a starting position such as an OFF position of the handles 18, 22.

The plumbing fixture assembly 10 may optionally include a soap dispenser 82. The soap dispenser 82 includes a sensor 84 (shown in FIG. 3). The sensor 84 may be a presence sensor that activates the dispensing of soap based on the detection of an object such as a user's hand. The plumbing fixture assembly 10 illustrated in FIG. 1 is shown positioned on a moveable cart. The plumbing fixture assembly 10 may also be installed in a restroom or a more permanent location, e.g., not on a moveable cart.

Figure 2:
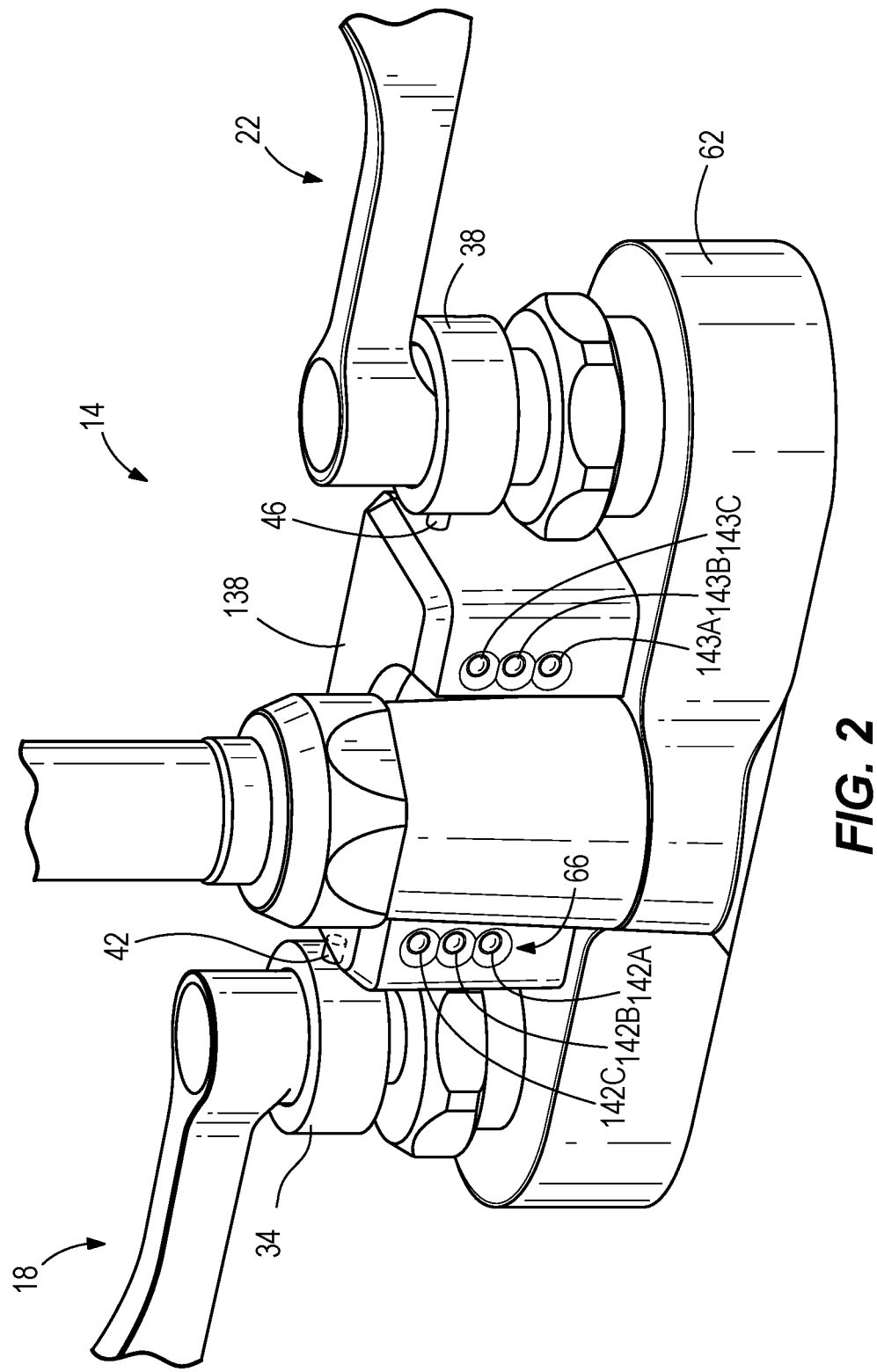
FIG. 2 is an enlarged perspective view of a faucet of the plumbing fixture assembly of FIG. 1 including a fluid flow detection system.

FIG. 2 illustrates an enlarged portion of the faucet 14 and some of the components of the fluid flow detection system 30. The fluid flow detection system 30 includes a first magnet 42 coupled to the first handle 18 and a second magnet 46 coupled to the second handle 22. The first magnet 42 is positioned on a rotatable stem of the first water handle 18, and the second magnet 46 is positioned on a rotatable stem of the second water handle 22. The magnets 42, 46 may be embedded in a collar 34, 38 as illustrated. In some embodiments, the magnets 42, 46 may be coupled to the handles 18, 22 at other locations, such as at a lever of the handles 18, 22, as long as the placement of the magnets 42, 46 causes the magnets 42, 46 to move in unison with the handles 18, 22 so that the magnets 42, 46 reflect the movement of handles 18, 22. In one configuration, the magnets 42, 46 are shaped as two-pole ring magnets. However, the magnets 42, 46 may be configured as an alternative shape (e.g., disc-shaped, rectangular, etc.).

The fluid flow detection system 30 also includes a first sensor 43 positioned near the first magnet 42 and a second sensor 47 positioned near the second magnet 46. The sensors 43, 47 are positioned within a housing 138. The sensors 43, 47 detect a varying magnetic field as the handles 18, 22 are moved. In particular, the sensors 43, 47 detect the handles 18, 22 crossing a start position and each position thereafter as the handles 18, 22 rotate through a full opening range of positions and stopping at a fully open position point. The sensors 43, 47 can detect the spatial position of the magnets 42, 46 relative to a starting point. The sensors 43, 47 are configured to sense the angular position of the handles 18, 22. In other words, the sensors 43, 47 detect the movement or displacement of magnets 42, 46 corresponding to the rotation of the handles 18, 22 and, by proxy, the valves they control.

The sensors 43, 47 are angular position sensors (e.g., Hall-effect sensors available from Monolithic Power Systems, Inc., of San Jose, Calif.) which detect a magnetic field and thus, rotational and/or angular movement of the faucet handles 18, 22. However, other non-contact arrangements may be implemented. For example, it is contemplated that a permanent magnet can be affixed to a part of the faucet 14 that actuates linearly, and thus linear movement could be detected and correlated to fluid flow to similar effect. It is also contemplated that non-magnetic position sensors for the handles 18, 22 may also be employed to similar effect.

Figure 3:
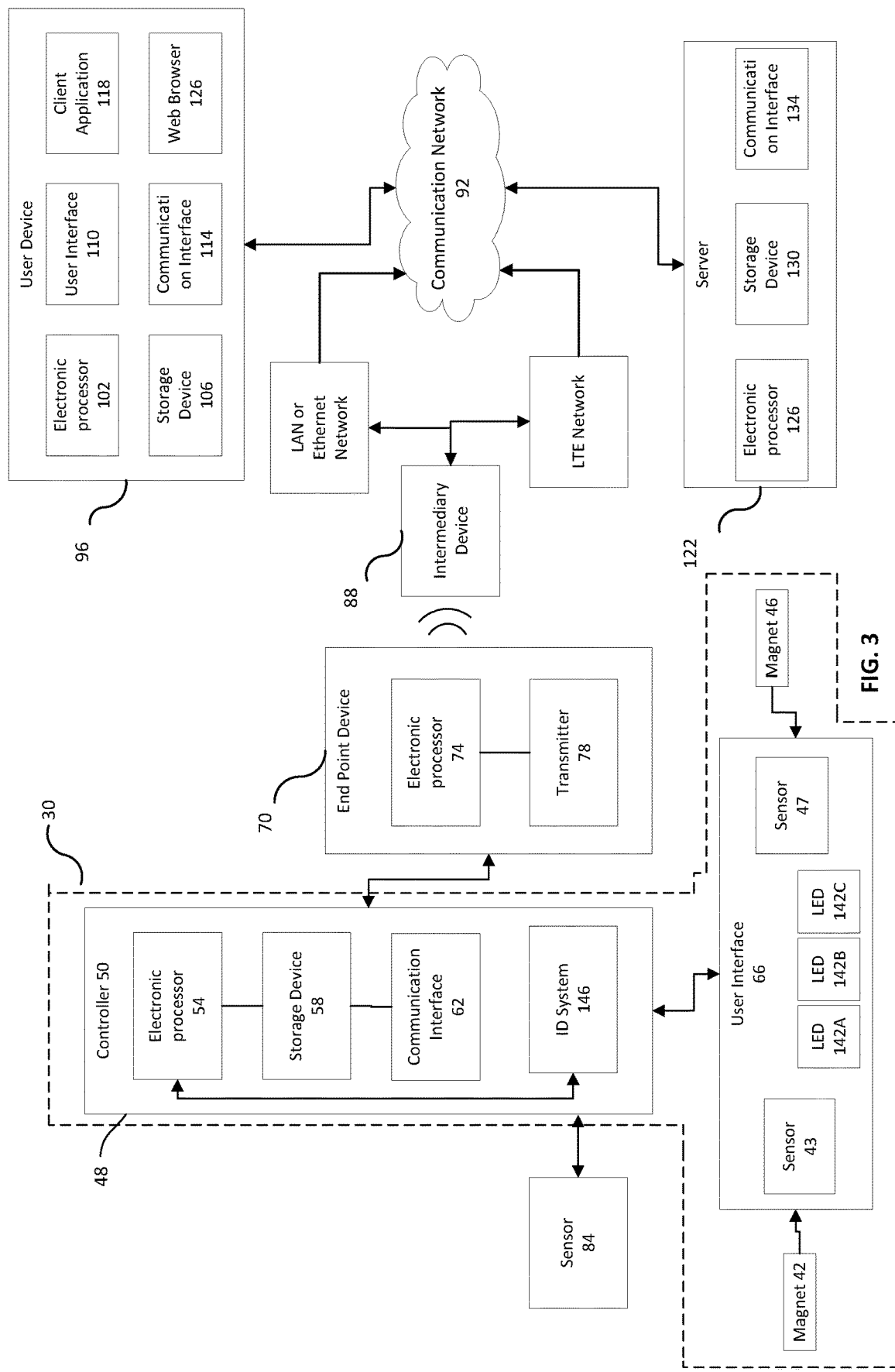
FIG. 3 is a schematic of the fluid flow detection system and network communication capabilities of the fluid flow detection system.

With reference to FIG. 3, the fluid flow detection system 30 includes a first housing 48 that supports a controller 50. The controller 50 includes an electronic processor 54 (for example, a microprocessor, an application-specific integrated circuit (ASIC), a field-programmable gate array (FPGA), or other suitable electronic device configured to process data), a memory 58, and a communication interface 62. In some embodiments, the controller 50 also includes a user interface 66. The electronic processor 54, the storage device 58, the communication interface 62, and the optional user interface 66 are communicatively coupled over one or more communication lines or buses, wirelessly, or combinations thereof. It should be understood that, in other constructions, the controller 50 includes additional, fewer, or different components than those illustrated in FIG. 3.

The controller 50 can communicate with the sensors 43, 47, 84 via the communication interface 62. In some embodiments, the communication interface 62 includes a wireless transceiver for wirelessly communicating with the sensors 43, 47, 84, such as a radio frequency (RF) transceiver for communicating over a communications network (for example, the Internet, a local area network, Wi-Fi, Bluetooth, or a combination thereof). Alternatively or in addition, the communication interface 62 may include a port for receiving a cable, such as an Ethernet cable, for communicating with the sensors 43, 47, 84 (over a dedicated wired connection or over a communications network). Alternatively or in addition, the sensors 43, 47, 84 may be hardwired to the processor 54.

The storage device 58 includes a non-transitory, computer-readable storage medium storing program instructions and data. The electronic processor 54 is configured to retrieve instructions from the storage device 58 and execute the instructions to perform a set of functions, including the methods described herein. The user interface 66 receives input from and provides output to users, such as healthcare personnel related to hand washing tasks. The user interface 66 may include a keyboard, a keypad, a microphone, a camera, a cursor-control device (for example, a mouse, a joystick, a trackball, a touch pad, and the like), a display (for example, a liquid crystal display (LCD), a light emitting diode (LED) display, a touchscreen), a speaker, or combinations thereof.

The controller 50 (the electronic processor 54 through the execution of instructions) receives magnetic field data collected by the sensors 43, 47 and can convert the data into one or more flow parameters of the faucet 14, such as whether fluid is flowing, the flow rate, and temperature. The controller 50 receives data from the sensor 84 when soap is dispensed from the soap dispenser 82. The controller 50 uses one or more of these parameters to determine hand washing compliance (discussed below).

The controller 50 can communicate with an end-point device 70 through the communication interface 62 to transmit data to the water management system. The end-point device 70 includes an electronic processor 74 and a transmitter 78 (i.e., LoRa radio system). In some embodiments, the electronic processor 74 wirelessly transmits data via the transmitter 78 to a local gateway or intermediary device 88 positioned near the end point device 70. The intermediary device 88 can collect data from the electronic processor 74 and then transmit the data on to a communication network 92 via Ethernet connection to a local area network (LAN) or via LTE cellular for storage and access by a server 122 and a user device 96.

Portions of the communication network 92 may be implemented using a wireless network, such as a wide area network (for example, the Internet), a local area network (for example, a Bluetooth™ network, or Wi-Fi), or combinations or derivatives thereof. Alternatively or in addition, portions of the communication network 92 may be implemented using dedicated connections (such as wired or wireless connections).

With continued reference to FIG. 3, in some embodiments, the user device 96 is a personal computing device, for example a desktop computer, a laptop computer, a terminal, a smart television, an electronic whiteboard, a tablet computer, a smart telephone, a wearable device, or the like. The user device 96 includes an electronic processor 102, a computer-readable memory 106, and a user interface 110. The electronic processor 102, the memory 106, and the user interface 110 communicate over one or more communication lines or buses, wirelessly, or a combination thereof. In some embodiments, the user device 96 includes additional components than those illustrated in FIG. 3 and the components included in the user device 96 may be arranged in various configurations. For example, in some embodiments, the user device 96 also includes a communication interface 114, for example a transceiver, that allows the user device 96 to communicate with external devices, for example one or more servers 122 over the communication network 92 or directly with an end point device 70. The user device 96 may also perform additional functionality than the functionality described in the present application.

The electronic processor 102 may include a microprocessor, application-specific integrated circuit (ASIC), or another suitable electronic device. The electronic processor 102 is configured to retrieve data from the memory 106 and execute, among other things, software related to the processes and methods described herein. The memory 106 includes a non-transitory, computer-readable storage medium. The memory 106 can include a client application 118, executed by the electronic processor 102, to access various services and data provided by the server 122. The client application 118 includes a web browser 120 (e.g., Internet Explorer®, Google Chrome®, or the like) that allows the user device 96 to access the services provided by the server 122.

The user interface 110 includes an input device, an output device, or a combination thereof. For example, the user interface 110 may include a display device, a touchscreen, a keyboard, a keypad, a button, a cursor-control device, a printer, a speaker, a virtual reality headset, a microphone, and the like.

With reference to FIG. 3, the server 122 may be a web server where web pages can be accessed over the communication network 92 through a client like a web browser on a user device 96. The server 122 includes a server electronic processor 126 and a server storage device 130. The server 122 also includes an input/output interface 134 that allows the server 122 to communicate with external devices, for example the user device 96. It is to be understood that the server 122 may include more than one processor or may be implemented as one of multiple servers configured to perform the methods described herein in a cloud computing environment, a data center, or the like.

The controller 50 receives data from the sensors 43, 47 which corresponds to the position of the handles 18, 22, and converts the data into flow rate conditions of the faucet 14 by performing a series of calculations. The controller 50 can store the data in the storage device 58 and/or transmit the data to the end-point device 70 for communication to the user device 96 via the network 92.

The controller 50 is configured to receive initial calibration data, such as certain information about the faucet 14 and the plumbing arrangement, in order to be able to perform the various calculations and provide useful data to the user interface 66 and to the user device 96. For example, the controller 50 is configured to receive information that includes the flow rates associated with different positions of the handles 18, 22 (or at least a maximum flow rate associated with the fully opened position of the handles), and/or the temperature of the water being provided to each of the valves prior to mixing and exiting the spout 26. Such information may be provided to the controller 50 by the installer or end user, generally speaking, during installation of the plumbing fixture assembly 10 through the user interface 66 in communication with the controller 50 or through the user device 96. For example, depending on the type of valve, it may be the case that flow rates at various states of the valve being opened or a maximum flow condition are input by the user. However, in some instances, there may be other devices that could be temporarily connected to the plumbing fixture assembly 10 (e.g., at the spout 26 of the faucet 14) to read the parameters of interest (e.g., the flow rate, temperature and so forth) to input the data to the controller 50. In some instances, it may be sufficient to merely input a maximum flow rate for the fully opened handle(s) 18, 22 and establish the positional range over which the handle(s) 18, 22 may move from fully closed to fully opened. However, in some instances, such simplistic information alone may not be sufficient. For example, some valves may have a non-linear response over a range of operational angles or positions of the handles, and it may be necessary to establish parameters for the flow rate through the valve at various positions of the attached handle(s) 18, 22. In this case, it may be necessary for the installer or user to provide the controller 50 with additional information about the type of valve or to collect readings at various handle positions. Additional information for calibration purposes may include water pressure, temperature, pipe size, and whether an aerator is on the faucet 14.

After system-level parameters and conditions are established in the controller 50, when the displacement of one or both of the valve-controlled handles 18, 22 occurs and fluid flow commences, the fluid flow through the faucet 14 can be calculated in real-time by detecting or measuring the position of the handle(s) 18, 22 using the magnets 42, 46 and non-contact sensor(s) 43, 47. Based on the correlation between those handle positions and the flow rates, the flow rate through each of the handle-controlled valves can be determined or estimated as well as additively through the faucet 14, collectively. Similarly, if the flow rates and water temperatures are known from each valve, the overall output temperature can be calculated or estimated. Additionally, total flow volume through the faucet 14 can be calculated based on how long the handles 18, 22 were turned to an ON position.

The fluid flow detection system 30 also includes a second housing 138 for supporting a first set of LEDs 142A-C (e.g., indicating water signals) on one side of the faucet 14 and a second set of LEDs 143A-C (e.g., indicating soap signals) on the opposite side of the faucet 14 that provide feedback to a user of the plumbing fixture assembly 10. For example, the first LEDs 142A, 143A may be green, the second LEDs 142B, 143B may be yellow, and the third LEDs 142C, 143C may be red. The LEDs 142A-C and 143A-C are electrically coupled to the controller 50 to control when and which LED is to illuminate. The second housing 138 may also include a speaker to provide audible feedback to the user of the assembly 10. The second housing 138 also supports the sensors 43, 47.

The first housing 48, mentioned above, can include an identification system 146 configured to determine and track the user of the plumbing fixture assembly 10. For example, the identification system 146 may be any suitable device capable of detecting a user (e.g., RFID reader, a near-field reader, an identification badge reader, an optical retina scanner, etc.).

As noted above, the plumbing fixture assembly 10 is operable to monitor hand washing and determine compliance with a predetermined hand washing routine. Users may be tracked using a RFID badge or the like that is read or detected by the identification system 146 when the user approaches the plumbing fixture assembly 10. When a user is present at the faucet 14 and identification has been detected, the controller 50 activates the LEDs 142A-C, 143A-C to provide instructions and feedback to a user on how to comply with a hand washing routine. For example, the LEDs 142A-C, 143A-C can help users know if they have complied with hygienic practices such as hand-washing by indicating via the LEDs 142A-C, 143A-C how long to initially rinse, when to apply soap, for how long scrubbing should occur, and how long to rinse. When the user has met hand-washing compliance, the controller 50 instructs the green LED 142A to illuminate. Alternatively, if the user has not met hand-washing compliance, the controller 50 instructs the red LED 142C to illuminate.

Figure 4:
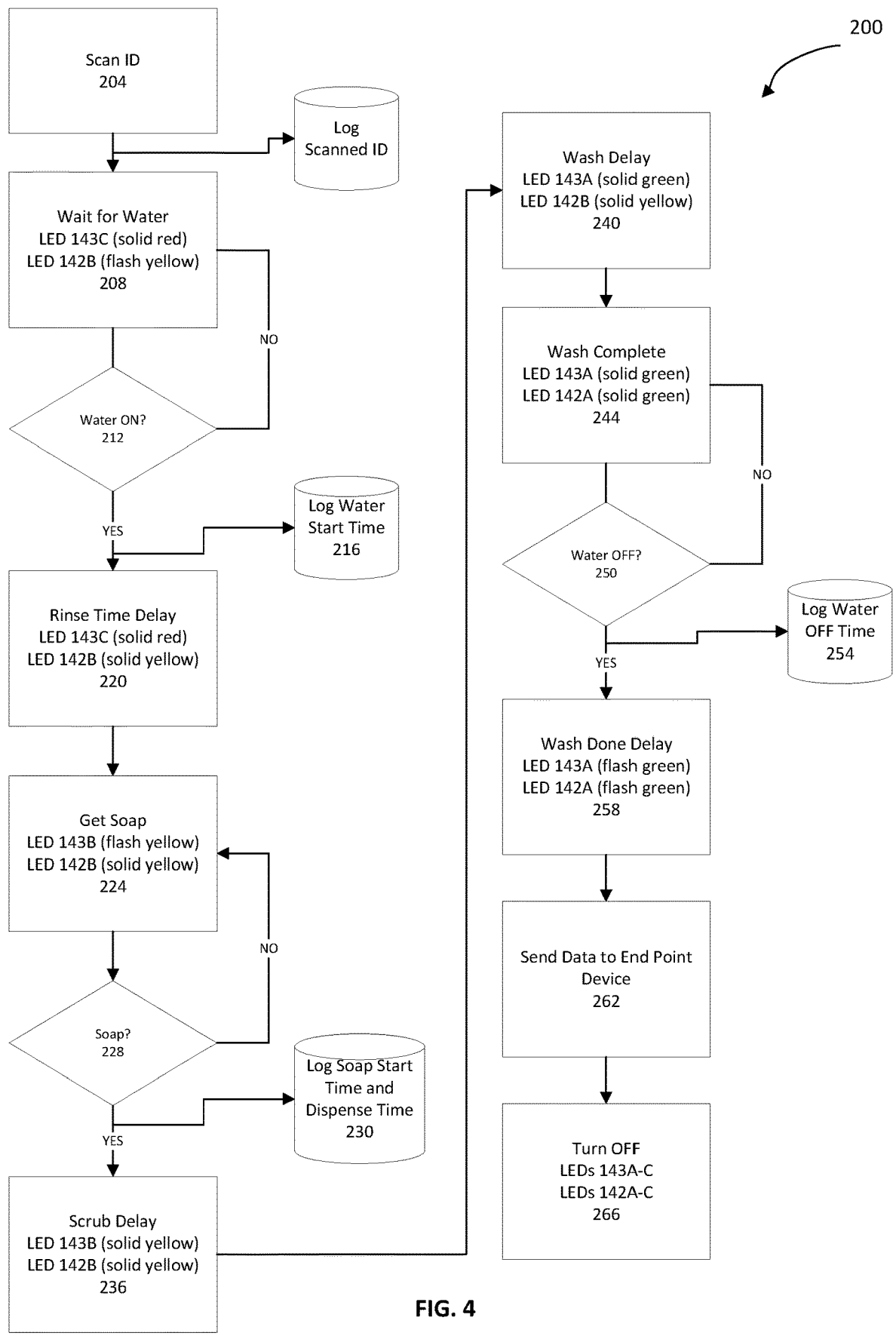
FIG. 4 is a flowchart of a process for hand washing and determining whether hand-washing by a user meets a predetermined compliance metric.

FIG. 4 illustrates a process 200 of determining hand washing compliance of a user. The process begins at step 204 wherein the user interacts with the identification system 146 in order to indicate their presence. Upon detection of the presence of the user, the controller 50 logs the user information and sends signals (at 208) to illuminate LED 143C (solid red soap) and LED 142B (flashing yellow water) and waits for activation of the faucet 14. Upon activation of the water (at 212) by the user (after the sensor(s) 43, 47 sense the spatial orientation of the magnet(s) 42, 46 that the water has been turned ON and communicate the spatial orientation to the controller 50), the controller 50 starts (at 216) a timer 150. The start time of the timer 150 is logged in the storage device 58. After the water is turned ON, the controller 50 sends signals (at 220) to illuminate (or keep illuminated) LED 143C (solid red soap) and LED 142B (solid yellow water). This signals to the user to initially wet/rinse their hands. After a predetermined time delay (e.g., 5 seconds after the timer 150 was started), the controller 50 sends signals (at 224) to illuminate (or keep illuminated) LED 143B (flashing yellow soap) and LED 142B (solid yellow water) indicating that the user needs to activate the soap dispenser 82. If the soap dispenser 82 is activated (the controller 50 receives a signal from the soap sensor 84) (at 228) the controller 50 logs (at 230) when the soap dispenser 82 was activated. After the soap dispenser 82 is activated, the controller 50 sends signals (at 236) to illuminate (or keep illuminated) LED 143B (solid yellow soap) and LED 142B (solid yellow water). This signals to the user to scrub their hands. After a predetermined time delay (e.g., 20 seconds after the soap dispenser 82 was activated), the controller 50 sends signals (at 240) to illuminate (or keep illuminated) LED 143A (solid green soap) and LED 142B (solid yellow water). This signals to the user to rinse their hands. After a predetermined time delay (e.g., 25 seconds after the soap dispenser 82 was activated (which provides 5 seconds after scrubbing)), the controller 50 sends signals (at 244) to illuminate (or keep illuminated) LED 143A (solid green soap) and 142A (solid green water). This signals to the user to turn OFF the faucet 14. The controller 50 detects (at 250) that the water was turned OFF and deactivates (at 254) the timer 150 and logs the OFF time. After the water is turned OFF, the controller 50 sends signals (at 258) to illuminate (or keep illuminated) LED 143A (flashing green soap) and LED 142A (flashing green water). The controller 50 then sends (at 262) the timer 150 data that was logged for the hand washing routine to the end point device 70 for communication to the server 122 and review at the user device 96. After transmitting the data to the end point device 70, the controller sends signals (at 266) to turn OFF the LEDs 142A-C and 143A-C.

Figure 5:
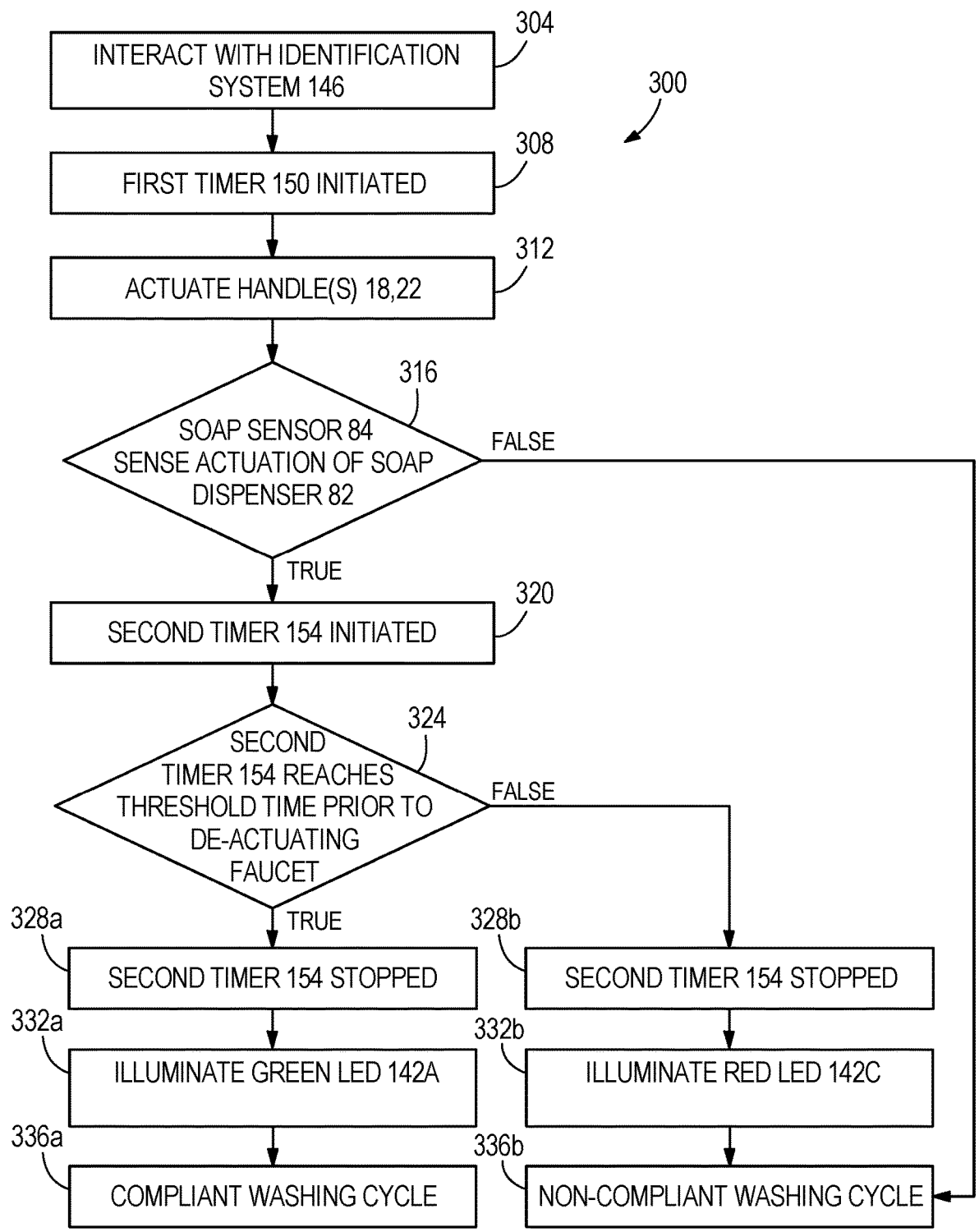
FIG. 5 is a flowchart of a process for hand washing and determining whether hand-washing by a user meets a predetermined compliance metric.

FIG. 5 illustrates another process 300 of determining hand washing compliance of a user. The process begins at step 304 wherein the user interacts with the identification system 146 in order to indicate their presence. In step 304, the identification system 146 transmits data signifying the presence of the user to the controller 50, and the controller 50 determines the identity of the user. Specifically, the RFID reader determines a unique or encrypted number from the user's badge corresponding to the identity of the user. Alternatively, in some embodiments, the identification system 146 may transmit the user identification data to the server 122. Upon detection of the presence of the user, the controller 50 starts a first timer 150 (at 308). At 312, the user then actuates the faucet 14, and proceeds to wet their hands. More specifically, the user actuates at least one of the faucet handles 18, 22, thereby causing movement of the handle(s) 18, 22 and the corresponding magnet(s) 42, 46. The sensors 43, 47 sense the spatial orientation of the magnet(s) 34, 38 and communicate the spatial orientation to the controller 50. At step 316, the user may then place a hand under the soap dispenser 82, thereby causing the sensor 84 to activate the soap dispenser 82 to dispense soap into the user's hands. Step 316 returns "True" if the soap sensor 84 senses the actuation of the dispenser 82 and communicates said actuation to the controller 50. Alternatively, step 316 returns "False" if the soap sensor 84 does not sense the actuator of the dispenser 82. In step 320, the controller 50 then initiates a second timer 154 to start recording the duration of time the handle(s) 18, 22 are maintained at the given position. The user then proceeds to scrub and rinse their hands with the water flowing from the faucet 14.

In order to reach compliance standards, the user must wash their hands for a predetermined duration of time. Specifically, in step 324, if the second timer 154 reaches a pre-determined or threshold duration of time prior to the user de-actuating the faucet 14, the controller 50 automatically stops the second timer 154 (step 328*a*). The controller 50 then records the total duration of time of the hand-wash cycle and sends a signal to illuminate the green LED 142A (step 332*a*), therefore indicating to the user that their hand-wash cycle was compliant. Additionally, in step 336*a*, the controller 50 sends the data to the server 122, which stores the data as a "compliant washing cycle" for the user. The user may then de-actuate the faucet 14.

Alternatively, in the event that the user de-actuates (e.g., turns off) the faucet 14 prior to reaching the predetermined threshold time (step 324), the controller 50 stops the second timer 154 (step 328*b*) and records the total duration of time of the hand-wash cycle. The controller 50 determines that the recorded time is less than the threshold duration of time and sends a signal to illuminate the red LED 142C (step 332*b*), therefore indicating to the user that their hand-wash cycle was non-compliant. Additionally, in step 336*b*, the controller 50 sends the data to the server 122, which stores the data as a "non-compliant washing cycle" for the user.

As described above in steps 228 or 316, in the event that the user does not actuate the soap dispenser 82, the controller 50 marks the hand-wash cycle as a "non-compliant washing cycle." Specifically, if the user actuates the faucet 14, positions their hands under the faucet 14, and then de-actuates the faucet 14 without actuating the soap dispenser 82, the controller 50 then sends a signal to illuminate the red LEDs 142C and/or 143C. Therefore, it is indicated to the user that their hand-wash cycle was non-compliant. Additionally, the controller 50 sends the data to the server 122, which stores the data as a "non-compliant washing cycle" for the user.

As previously mentioned, the controller 50 records data associated with the user for a predetermined amount of time (e.g., the predetermined amount of time the first timer 150 is configured to run). If the user completes the hand-wash cycle within the predetermined amount of time, the first timer 150 automatically stops upon completion of the hand-wash cycle. However, in the event that the user does not complete the hand-wash cycle within the predetermined amount of time, the process automatically "times out." If the first timer 150 "times out" during the hand-wash cycle, the controller 50 stores the data as a "timed out cycle" for the user.

Figure 6:
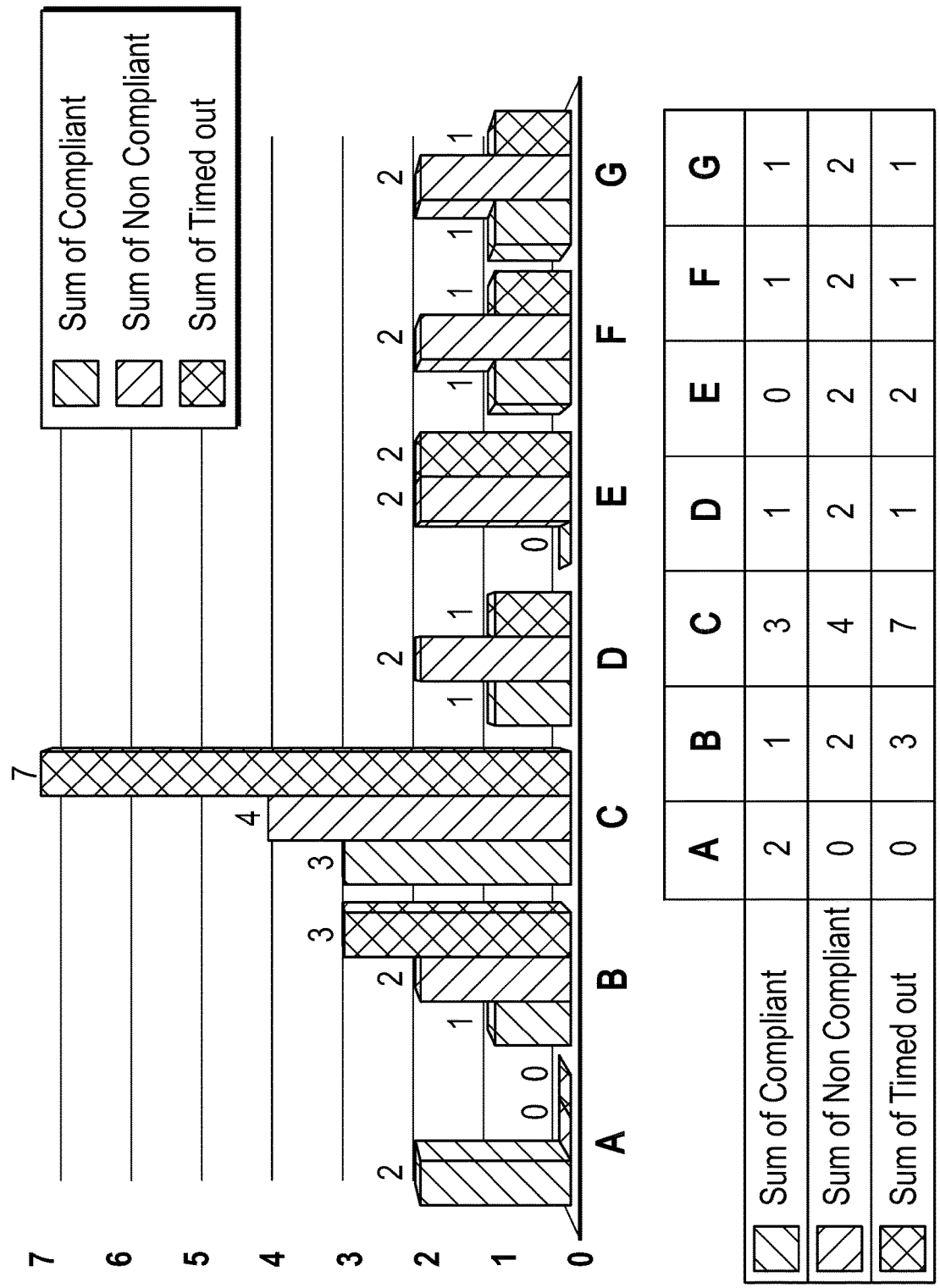
FIG. 6 illustrates a user interface displaying data collected and processed relating to hand washing.

The controller 50 sends the collected hand washing data to the server 122 such that the user device 96 can access and view the data. The data can be processed for display in a portal accessible by the web browser 120 of the user device 96. For example, as shown in FIG. 6, the user device 96 can display the data is graphical format indicating the users and their compliant, non-compliant, and timed-out hand washing events. The data can also include the particular plumbing fixtures where the user's hand washing events occurred. The control system 50 continuously monitors and tracks the user data, and displays multiple users' compliant washing cycles, non-compliant washing cycles, and timed out washing cycles. The graphical format enables a supervisor to monitor employee hand-wash cycles over a given amount of time, and to ensure the employees are meeting hand-washing compliance. These hand washing reports can be e-mailed or texted to individuals of interest through the portal.

It is also noted that the data transmitted to the server 122 and presented to a user device 96 can include operational data (e.g., how many times each plumbing fixture (e.g., faucet 14) was activated and deactivated, how much water was delivered through the faucet 14 (e.g., on each actuation and as an accumulated amount over time). This data can be displayed for each faucet 14 and multiple faucets 14 by room, by floor, by building or other relevant category. For example, the control system 50 continuously monitors and tracks the operational data of the plumbing fixtures and soap dispensers 82 to determine trends of usage (e.g., which fixture is used most often), when maintenance needs to occur (e.g., if one particular fixture is used most often, the soap will need to be replaced more often), and whether there are any malfunctions (e.g., a hand wash cycle is started, but not finished as determined by multiple users' hand wash data).

Figure 7:
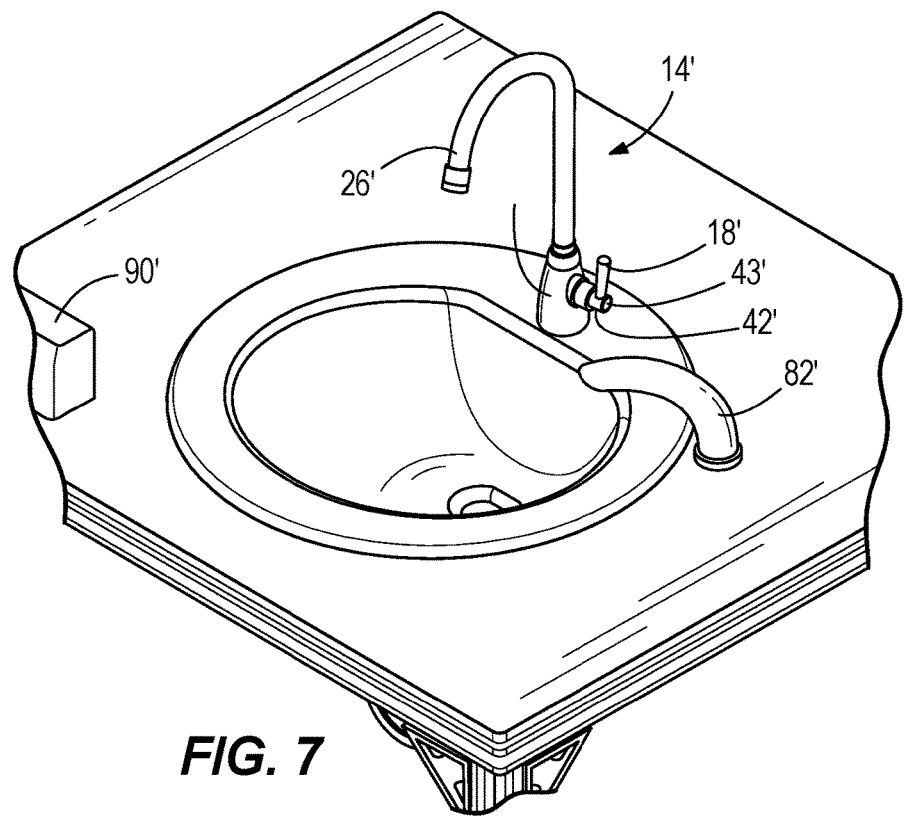
FIG. 7 is a perspective view of an alternative faucet for use with the plumbing fixture assembly of FIG. 1.

FIG. 7 illustrates an alternative faucet 14' for use with the plumbing fixture assembly 10. The illustrated faucet 14' is similar to the faucet 14 described above and includes like parts. Reference is hereby made to the description of the faucet 14 shown in FIGS. 1-2 for description of features and elements of the faucet 14' not specifically included below. The faucet 14' includes a single handle configuration, rather than a dual-handle configuration, which will be described below. Components that are similar to those described in the faucet 14 have the same reference number plus an apostrophe.

The faucet 14' includes a handle 18' and a magnet 42' and a sensor 43' The sensor 43' is an angular position sensor configured to sense movement of the magnet 42'. The spatial orientation of the magnet 42' is detected by the sensor 43' such that the angular position or displacement of the magnet 42' corresponding to the rotation of the handle 14', and therefore, the valve it controls, is determined. More specifically, the sensor 43' detects the movement of the magnet 42' in a first direction, corresponding to the opening of a first valve (e.g., a hot water valve), and detects the movement of the magnet 42' in a second direction, corresponding to the opening of a second valve (e.g., a cold water valve). The sensor 43' communicates the angular displacement data to the controller 50.

Figure 8:
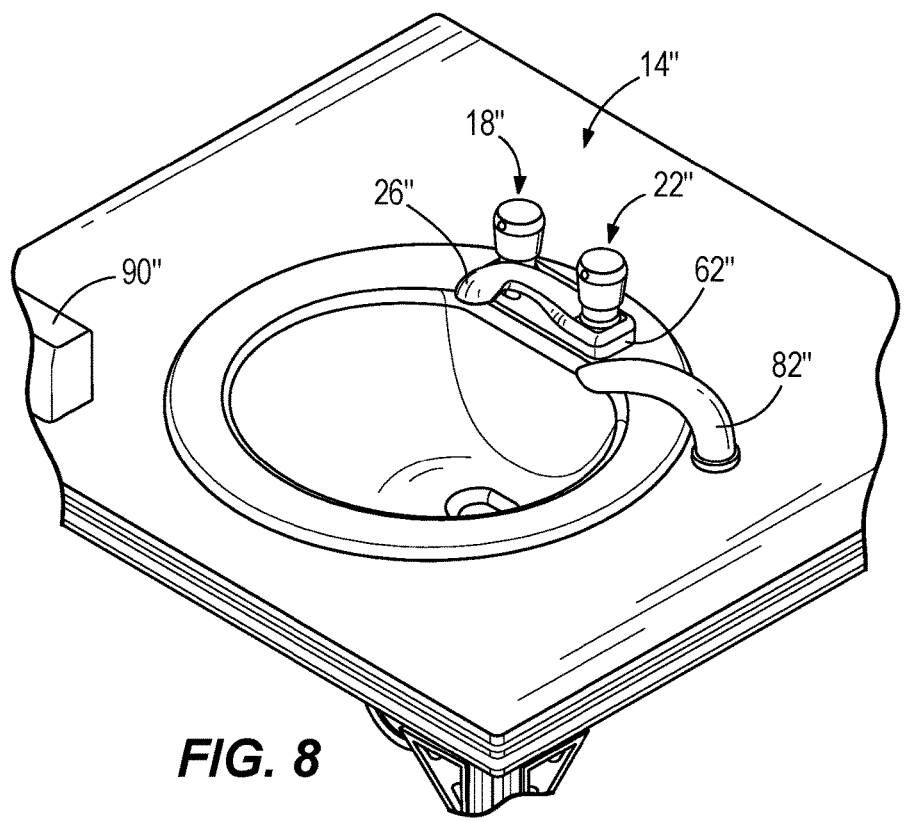
FIG. 8 is a perspective view of an alternative faucet for use with the plumbing fixture assembly of FIG. 1.
Figure 9A:
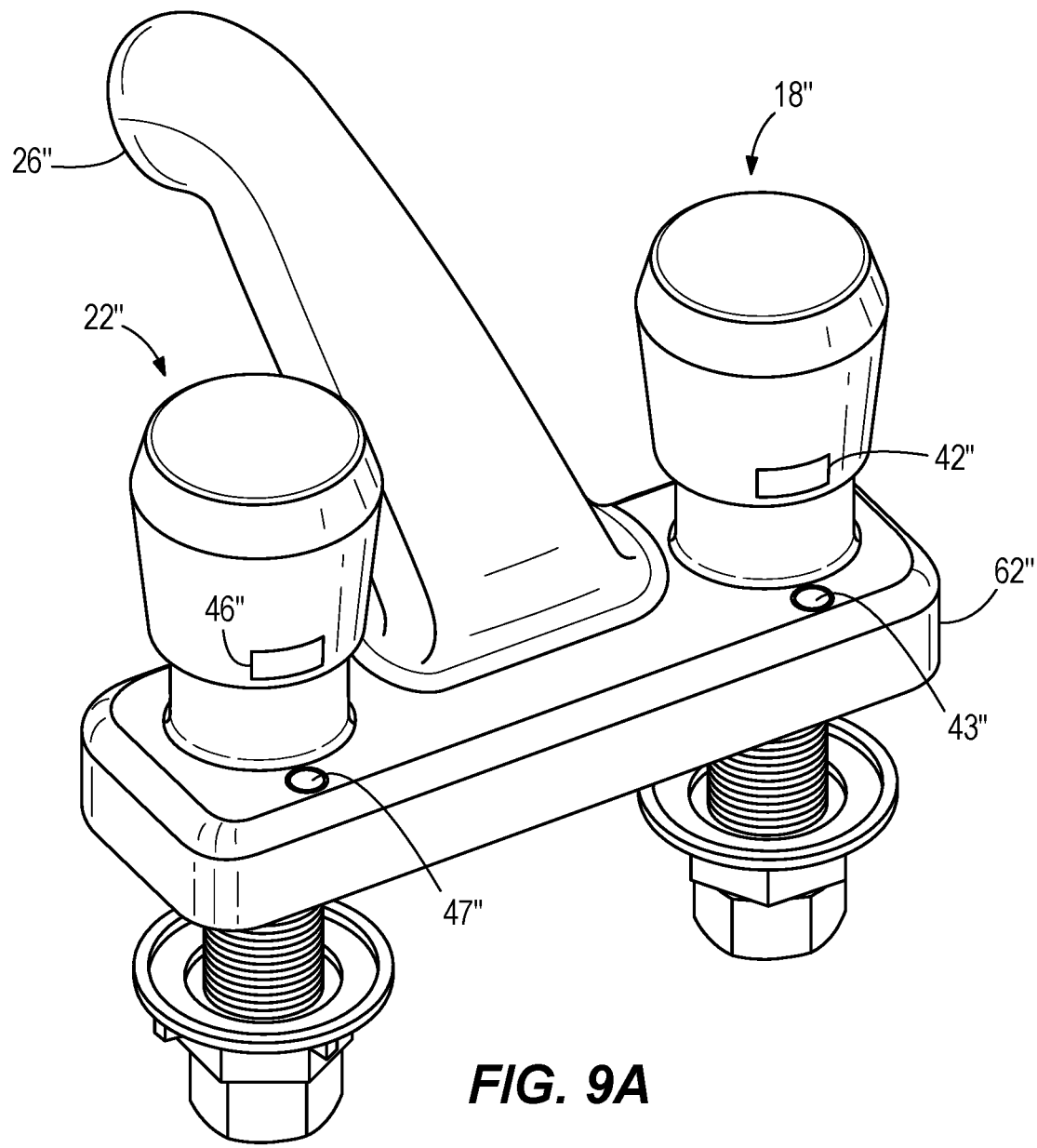
FIG. 9A is an enlarged perspective view of the faucet of FIG. 8, including a fluid flow detection system.
Figure 9B:
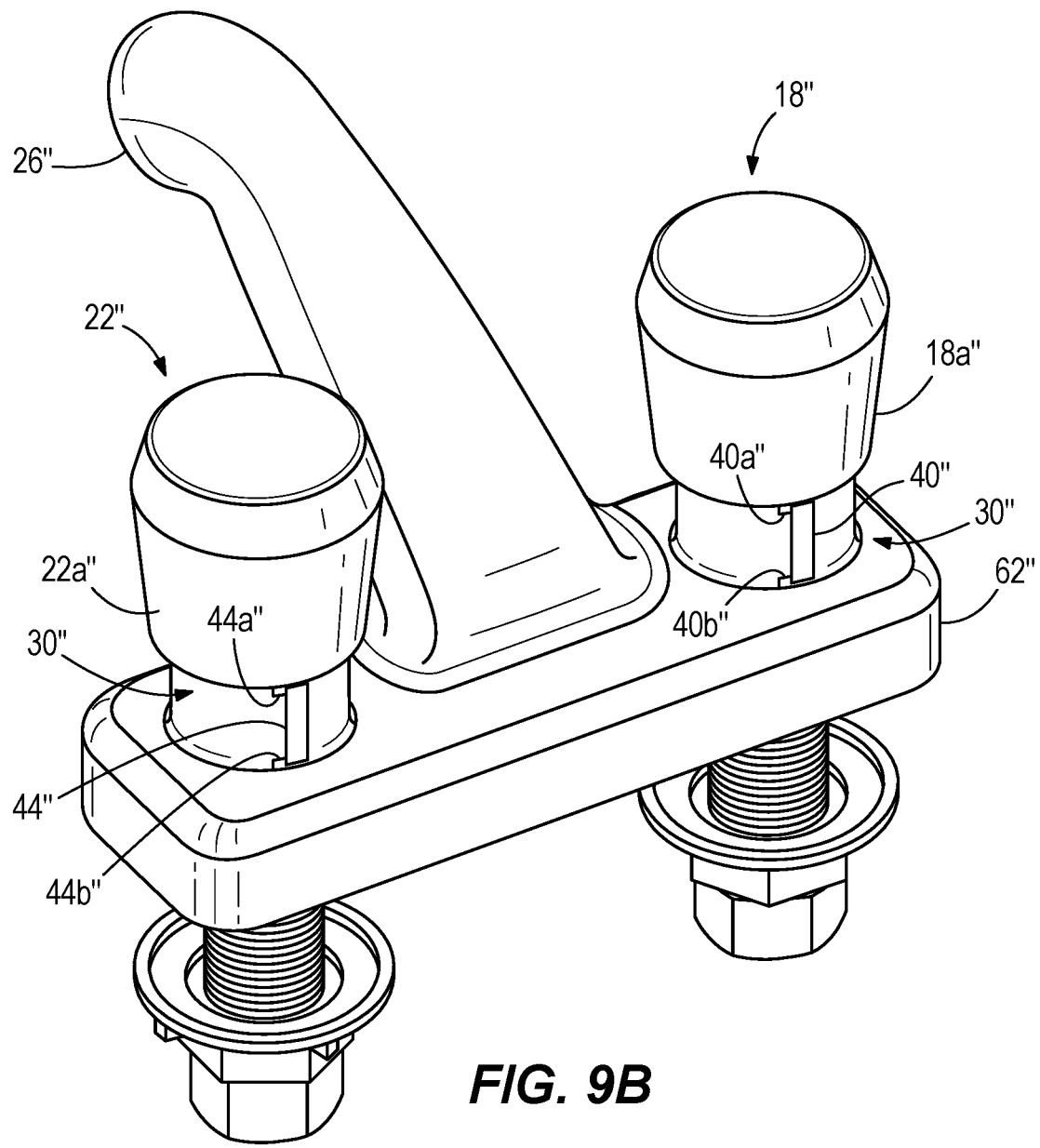
FIG. 9B is an enlarged perspective view of the faucet of FIG. 9, including an alternative fluid flow detection system.

FIGS. 8, 9A, and 9B illustrate an alternative faucet 14" for use with the plumbing fixture assembly 10. The illustrated faucet 14" is similar to the faucet 14 described above and includes like parts. Reference is hereby made to the description of the faucet 14 shown in FIGS. 1-2 for description of features and elements of the faucet 14" not specifically included below. The faucet 14" is a metering faucet, rather than a lavatory faucet, which will be described below. Components that are similar to those described in the faucet 14 have the same reference number plus two apostrophes.

With reference to FIGS. 8 and 9A, the faucet 14" includes a first water handle 18" (e.g., a hot water handle) and a second water handle 22" (e.g., a cold water handle) which are each connected to an underlying valve that controls water from a source to a spout 26" of the faucet. The faucet 14" includes a fluid flow detection system 30" configured to monitor the linear position of the first and second water handles 18", 22" relative to the faucet 14". In the illustrated embodiments, the fluid flow detection system 30" includes a first magnet 42", a second magnet 46", a first sensor 43", and a second sensor 47". Specifically, the first magnet 42" is positioned on a stem of the first water handle 18", and the second magnet 46" is positioned on a stem of the second water handle 22". The first sensor 43" is positioned on a stationary, main body 62" of the faucet 14", adjacent the first handle 18", and the second sensor 47" is positioned on the main body 62" of the faucet 14", adjacent the second handle 22". The spatial orientation of the magnets 42", 46" are read by sensors 43", 47" such that the sensors 43", 47" detect the linear displacement of the magnets 42", 46" corresponding to linear movement of the handles 18", 22" The sensors 43", 47" communicate the linear displacement data to the controller 50.

In some embodiments (FIG. 9B), the fluid flow detection system 30" of the metering faucet 14" includes a first linear potentiometer 40" and a second linear potentiometer 44". Specifically, the first linear potentiometer 40" includes a first end 40a" positioned on the stem of the first water handle 18", and a second end 40b" positioned on the main body 62" of the faucet 14", adjacent the first handle 18". Similarly, the second linear potentiometer 44" includes a first end 44a" positioned on the stem of the second water handle 22" and a second end 44b" positioned on the main body 62" of the faucet 14" adjacent the second handle 22". Upon depression of the handles 18", 22" by a user, the linear potentiometers 40", 44" produce a resistance output, and communicate the resistance output data to the controller 50. The controller 50 then converts the data into flow rate conditions of the plumbing fixture assembly 10 by performing a series of calculations, as described above. The controller 50 then transmits the data to the server 122 as described above.

For reasons of completeness, various aspects of the invention are set out in the following numbered clauses:

Clause 1. A faucet comprising:
a spout in fluid communication with a fluid source;
a handle including a movable stem, the handle configured to control flow of fluid from the fluid source through the spout;
a magnet positioned on the stem and configured to move with the stem;
a sensor configured to detect a position of the magnet in real time;
a controller in communication with the sensor, wherein the controller is configured to determine at least one flow condition of the faucet upon activation of the handle to generate fluid flow through the spout, the at least one flow condition based on a position of the magnet; and
a user interface in connection with the controller, wherein the user interface is configured to display the at least one flow condition.

Clause 2. The faucet of clause 1, wherein the sensor assembly is configured to detect an angular position of the magnet.

Clause 3. The faucet of clause 1, wherein the sensor assembly is configured to detect a linear position of the magnet.

Clause 4. The faucet of clause 1, wherein the controller is calibrated based on a maximum faucet flow and the position of the magnet.

Clause 5. The faucet of clause 1, wherein is magnet is a two-pole ring magnet.

Clause 6. The faucet of clause 1, further comprising a soap dispenser, wherein the soap dispenser includes a second sensor configured to detect the dispensing of soap from the soap dispenser.

Clause 7. The faucet of clause 1, further comprising a timer configured to record a duration of time the handle is maintained at a position.

Clause 8. The faucet of clause 1, wherein the sensor is positioned on a main body of the faucet adjacent the magnet.

Clause 9. The faucet of clause 1, further comprising a feedback system in connection with the controller, wherein the feedback system includes an indicator.

Clause 10. The faucet of clause 9, wherein the feedback system is configured to emit light through the indicator corresponding to the at least one flow condition.

Clause 11. A plumbing fixture assembly comprising:
a faucet including a handle;
a monitoring system configured to monitor a position of the handle;
a timer configured to record a duration of time the handle is maintained at the position;
a controller in communication with the monitoring system, wherein the controller is configured to determine whether a hand-washing activity is in compliance based on the duration of time the handle is maintained at the position; and
a user interface in communication with the controller, wherein the interface is configured to display whether the hand-washing activity is compliant.

Clause 12. The plumbing fixture assembly of clause 11, further comprising
a soap dispenser; and
a sensor in connection with the soap dispenser, wherein the sensor is configured to detect dispensing of soap from the soap dispenser.

Claim 13. The plumbing fixture assembly of clause 12, wherein the controller is in connection with the sensor; and wherein the controller is configured to generate a first hand-washing metric in response to the sensor detecting the dispensing of soap, and the controller is configured to generate a second hand-washing metric in the absence of the sensor detecting the dispensing of soap.

Clause 14. The plumbing fixture assembly of clause 11, further comprising a module configured to detect the presence of a user.

Clause 15. The plumbing fixture assembly of clause 11, further comprising a feedback system including a plurality of indicators, wherein the feedback system is configured to emit light through the plurality of indicators in response to the duration of time the handle is maintained at the position.

Clause 16. The plumbing fixture assembly of clause 11, wherein the faucet includes a magnet positioned on the handle and operable to move with the handle, and the monitoring system includes a sensor configured to detect the position of the magnet.

Clause 17. The plumbing fixture assembly of clause 16, wherein the sensor is configured to detect an angular position of the magnet and a linear position of the magnet.

Clause 18. The plumbing fixture assembly of clause 11, wherein the monitoring system includes a linear potentiometer coupled to the faucet, wherein the linear potentiometer is configured to detect a resistance value.

Clause 19. The plumbing fixture assembly of clause 18, wherein the controller is configured to calculate at least one flow condition corresponding to the resistance value.

Clause 20. A method of detecting flow through a faucet, the method comprising:
detecting a position of a magnet disposed on a handle of the faucet, the position corresponding to a flow rate of the faucet;
recording, with a first timer, a duration of time the magnet is maintained at the position;
operating a controller to calculate a hand-washing metric based on the duration of time the magnet is maintained at the position; and
displaying the hand-washing metric on an interface of a user device.

Clause 21. The method of clause 20, further comprising
calculating, using the controller, a predicted flow rate based on the position of the magnet; and
displaying the predicted flow rate on the user interface.

Clause 22. The method of clause 20, further comprising:
detecting the temperature of at least one water supply for the faucet;
calculating a predicted temperature based on a temperature of the at least one water supply and the position of the at least one handle; and
displaying the predicted temperature on the interface.

Clause 23. The method of clause 20, wherein flow through the faucet is not directly measured.

Clause 24. The method of clause 20, further comprising calibrating the controller based on a maximum faucet flow and the position of the magnet.

Clause 25. The method of clause 20, wherein the sensor is configured to detect an angular position of the magnet and a linear position of the magnet.

Clause 26. The method of clause 20, wherein the position is a discrete position over a continuous range of positions.

Clause 27. The method of clause 20, further comprising operating a feedback system to emit light via an indicator in response the duration of time the at least one magnet is maintained at the position.

Clause 28. The method of clause 21, further comprising initiating a second timer, wherein the second timer is configured to run for a predetermined period of time.

Clause 29. The method of clause 28, wherein the controller is configured calculate the hand-washing metric within the predetermined period of time.

Clause 30. The method of clause 20, wherein the controller is configured to generate a first hand-washing metric in response to detecting the magnet being maintained at the position at for a time greater than or equal to a threshold time, and the controller is configured to generate a second hand-washing metric in response to detecting the magnet being maintained at the position for a time less than the threshold time.

Clause 31. The method of clause 20, further comprising detecting the presence of a user via a presence sensor.

Clause 32. The method of clause 20, further comprising detecting activation of a soap dispenser dispensing soap.

Clause 33. The method of clause 32, wherein the hand-washing metric is additionally based on activation of the soap dispenser.

Clause 34. A method of identifying a user during a hand-washing cycle, the method comprising:
operating a module to identify the presence of a user;
operating the module to communicate the presence of the user to a controller; and
operating the controller to determine an encrypted number corresponding to an identity of the user.

Clause 35. The method of clause 34, further comprising in response to the module identifying the presence of the user, operating a timer to run for a predetermined period of time.

Clause 36. The method of clause 35, further comprising operating the controller to collect data on the user for the predetermined period of time.

Clause 37. The method of clause 34, further comprising displaying the encrypted number corresponding to an identity of the user on an interface.

Clause 38. A method of detecting flow through a manual faucet, the method comprising:

detecting an angular position of a hot water handle corresponding to the flow rate of the manual faucet;

detecting an angular position of a cold water handle corresponding to the flow rate of the manual faucet;

calculating a predicted flow based on the angular position of the hot water handle and the angular position of the cold water handle.

Clause 39. The method of clause 38, further comprising displaying the predicted flow on an interface.

Clause 40. The method of clause 38, further comprising the steps of:

detecting the temperature of at least one water supply for the manual faucet;

calculating a predicted temperature based on the temperature of the at least one water supply and the angular position of the hot water handle and the cold water handle; and displaying the predicted temperature on an interface.

Clause 41. The method of clause 38, further comprising the steps of:

calculating a handwashing metric; and displaying the handwashing metric on the interface.

Clause 42. The method of clause 41, wherein the handwashing metric corresponds to handwashing frequency.

Clause 43. The method of clause 38, wherein flow through the manual faucet is not directly measured.

Clause 44. The method of clause 38, further comprising the step of calibrating using a flow measurement of the manual faucet.

Clause 45. A method of detecting flow through a manual faucet in a non-contact fashion, the method comprising:

detecting a position of a handle for controlling flow through the manual faucet, wherein the position is a discrete position over a continuous range of positions;

calculating a predicted flow based on the position of the handle.

Clause 46. The method of clause 45, further comprising the steps of:

detecting the temperature of at least one water supply for the manual faucet; and calculating a predicted temperature based on the temperature of the at least one water supply and the angular position of the handle, and displaying the predicted temperature on an interface.

Clause 47. The method of clause 46, further comprising the step of calculating a handwashing metric, and displaying the handwashing metric on the interface.

Clause 48. The method of clause 47, wherein the handwashing metric corresponds to handwashing frequency.

Clause 49. The method of clause 45, further comprising the step of inputting a value associated with flow rate and the handle position.

Clause 50. The method of clause 45, wherein the flow through the manual faucet is not directly measured.

Clause 51. The method of clause 45, further comprising the step of calibrating using a flow rate measurement of the manual faucet.

Clause 52. A faucet assembly comprising:

a manual faucet including a hot water handle and a cold water handle;

at least one angular position sensor configured to detect an angular position of at least one of the hot water handle and the cold water handle in real time; and an interface configured to display a continuous non-contact reading of at least one flow condition corresponding to the faucet assembly.

Clause 53. The faucet assembly of clause 52, wherein the at least one angular position sensor includes:

at least one programmable integrated circuit board; and at least one magnet affixed to one of the handles;

wherein the integrated circuit board is calibrated based on a maximum faucet flow and the angular position of the hot water handle and of the cold water handle.

Clause 54. The faucet assembly of clause 53, wherein the at least one magnet comprises a cold water magnet and a hot water magnet; and the cold water magnet is positioned on the cold water handle and the hot water magnet is positioned on the hot water handle.

Clause 55. The faucet assembly of clause 53, wherein the at least one magnet is a two-pole ring magnet.

Clause 56. The faucet assembly of clause 52, further comprising a sensor to detect the dispensing of soap.

Various features of the invention are set forth in the following claims.

What is claimed is:

1. A method of monitoring a handwashing routine, the method comprising:

detecting, with a controller, an angular position of a magnet disposed on a handle of a faucet to determine whether water is flowing through the faucet;

activating a first timer in the controller when water is flowing through the faucet;

detecting, with the controller, whether activation of a soap dispenser occurred a predetermined time after the first timer was activated;

logging a first time from the first timer, in the controller, when the soap dispenser is activated;

activating a second timer in the controller after activation of the soap dispenser is detected;

alerting a user to turn off the faucet a predetermined time after the second timer was activated;

detecting an angular position of the magnet indicating that no water is flowing through the faucet;

logging a second time from the second timer, in the controller, when the angular position indicates that no water is flowing through the faucet;

determining, with an electronic processor, whether a handwashing routine is in compliance with a predetermined standard based on the time from the first timer and the time from the second timer; and enabling display of a first indicator representative of a compliant handwashing routine or a second indicator representative of a non-compliant handwashing routine.

2. The method of claim 1, further comprising transmitting the time from the first timer and the time from the second timer to an end point device prior to transmitting the time from the first timer and the time from the second timer to a database.

3. The method of claim 2, further comprising converting, at the end point, the time from the first timer and the time from the second timer into a LoRa data packet.

4. The method of claim 3, further comprising transmitting the LoRa data packet to a database.

5. The method of claim 4, further comprising scanning a user identification upon arrival at the faucet.

6. The method of claim 5, further comprising linking the time from the first timer and the time from the second timer to the user identification that was scanned when the user arrived at the faucet.

7. The method of claim 1, wherein the display is positioned adjacent to the faucet, and further comprising alerting the user on the display whether the handwashing routine is in compliance with the predetermined standard or whether the handwashing routine is not in compliance with the predetermined standard.

8. The method of claim 1, further comprising:
determining a total flow volume of water through the faucet for the handwashing routine; and
displaying, at a user device, the total flow volume of water through the faucet for the handwashing routine.

9. The method of claim 8, further comprising:
aggregating the total flow volume of water for all handwashing routines over a period of time; and
displaying, at a user device, an aggregated total flow volume of water for the period of time.

10. The method of claim 1, further comprising:
determining an output temperature of the water for the handwashing routine; and
displaying, at a user device, the output temperature of the water for the handwashing routine.

11. A system for monitoring a handwashing routine, the system comprising:
a sensor configured to detect an angular position of a handle on a faucet;
a controller in communication with the sensor, the controller configured to activate a first timer when water is flowing through the faucet when the angular positon of the handle indicates that water is flowing through the faucet; detect whether activation of a soap dispenser occurred a predetermined time after the first timer was activated;
log a first time from the first timer when the soap dispenser is activated;
activate a second timer after activation of the soap dispenser is detected;
alert a user to turn off the faucet a predetermined time after the second timer was activated;
log a second time from the second timer when the angular position of the handle indicates that no water is flowing through the faucet;
determine whether a handwashing routine is in compliance with a predetermined standard based on the time from the first timer and the time from the second timer; and
enabling display of a first indicator representative of a compliant handwashing routine or a second indicator representative of a non-compliant handwashing routine.

12. The system of claim 11, wherein the controller is further configured to transmit the time from the first timer and the time from the second timer to an end point device prior to transmitting the time from the first timer and the time from the second timer to a database.

13. The system of claim 12, wherein the end point device is configured to convert the time from the first timer and the time from the second timer into a LoRa data packet.

14. The system of claim 13, wherein the end point device is further configured to transmit the LoRa data packet to a database.

15. The system of claim 14, further comprising a user identification detector in communication with the controller, the user identification detector configured to a identify a user upon arrival at the faucet.

16. The system of claim 15, wherein the controller is further configured to link the time from the first timer and the time from the second timer to the user identification that was detected when the user arrived at the faucet.

17. The system of claim 11, further comprising a display positioned adjacent to the faucet, configured to receive the first indicator or the second indicator.

* * * * *